DYNAMIC STORAGE ANALOG COMPUTER

Filed March 31, 1961

2 Sheets-Sheet 1

FORWARD

REVERSE

Robert K. Stern
INVENTOR.

BY William R. Sherman

ATTORNEY

DYNAMIC STORAGE ANALOG COMPUTER

Filed March 31, 1961 2 Sheets-Sheet 2

Robert K. Stern
INVENTOR.

BY William R. Sherman

ATTORNEY

United States Patent Office
3,231,729
Patented Jan. 25, 1966

3,231,729
DYNAMIC STORAGE ANALOG COMPUTER

Robert K. Stern, Point Pleasant, Pa., assignor to Computer Systems, Inc., Monmouth Junction, N.J., a corporation of New York Filed Mar. 31, 1961, Ser. No. 99,793
16 Claims. (Cl. 235—183)

This invention relates to analog computers and more particularly to analog computers employing operational amplifiers in association with storage capacitors for memory or like purposes.

In analog computers, such functions as signal integration and setting in of initial values are commonly performed by computing or operational integrator amplifiers. For such purposes, the integrator amplifier typically includes a high-gain, direct coupled (D.C.) amplifier of single-ended, phase-inverting type. Either by fixed or patch bay connections, a degenerative feedback loop is provided between the output and input terminals of the amplifier, comprising an integrating capacitor. By a similar choice of connections, one or more input resistors have a common junction for applying the sum of a corresponding one or more input signals to the input terminal of the ampliler.

In order that integration of such input signals may be started from an initial value, a relay is arranged to switch the amplifier input from the common junction of such input resistors to the common junction of a feedback resistor and a like-valued initial condition (i.c.) input resistor. The amplifier then responds to the sum of its output voltage and a voltage $E_{i.c.}$ representing the initial value applied to the initial condition input resistor. Because of the high gain inverting action of an operational amplifier, its output is driven into (negative) correspondence with the initial condition voltage $E_{i.c.}$ in the time required for resetting the charge of the capacitor. When the relay couples the regular input signal or signals to the amplifier thereafter, the integration of these signals proceeds from such initial condition value.

In practice, the resetting time for the typical integrator amplifier is so long that use of this technique was generally limited to the beginning of a computing operation. Also, use of initial condition inputs was typically restricted to constant or, at best, slowly varying values, because the long resetting time produced a lag in the correspondence or tracking of the output signal with respect to the initial condition input.

For more versatile application of analog computers, however, it is highly desirable that the resetting capabilities of operational amplifiers arranged as memory units be extended to use in a cyclic or repetitive mode of computer operation, where the repetition rate may range, say, from about 50 to 1000 c.p.s. and higher. In one type of application, variables representing solutions obtained in successive cycles of repetitive operation may be stored dynamically for use in the next or subsequent cycles by means of fast resetting memory units. For purposes of controlling computer functions during repetitive operation, such memory units can provide a staircase output in synchronism with the stepwise advance of the problem in the machine, the successive values of the staircase output being used to control comparison circuits or to keep account of sequential operations in the course of a solution. In another type of application, the derivative of an input signal may be approximated by differencing of successive stored values.

Accordingly, it is an object of the present invention to provide new and improved analog computers arranged for dynamic storage of values.

Another object of the present invention is to provide new and improved analog computers arranged for storage during recurrent intervals of values obtained at an instant during respective preceding intervals.

A further object of the present invention is to provide new and improved analog computers wherein values may be acquired, stored and shifted between successive operational amplifiers during recurrent intervals to perform a variety of computing functions.

These and other objects are attained, in accordance with the invention, by providing an analog computer with a plurality of operational amplifiers arranged for cascaded connection and each capable of reproducing an input signal and capacitively storing the value thereof during successive intervals. Control means are provided for determining the instant when the input signal has its value stored at the amplifier output. By programming the acquisition and storage of values by successive amplifiers in timed relation (e.g., phase opposition or alternation) the value stored by an amplifier in one interval may correspond with the value stored in a preceding amplifier during a preceding interval, while the preceding amplifier acquires a new value. Provision is made for speedy resetting of the amplifiers so that such intervals may be short, as for purposes of a high rate of periodic repetition.

The invention, together with others of its objects and advantages, will be better understood from the following detailed description taken in conjunction with the drawings in which.

Figures 1, 2:
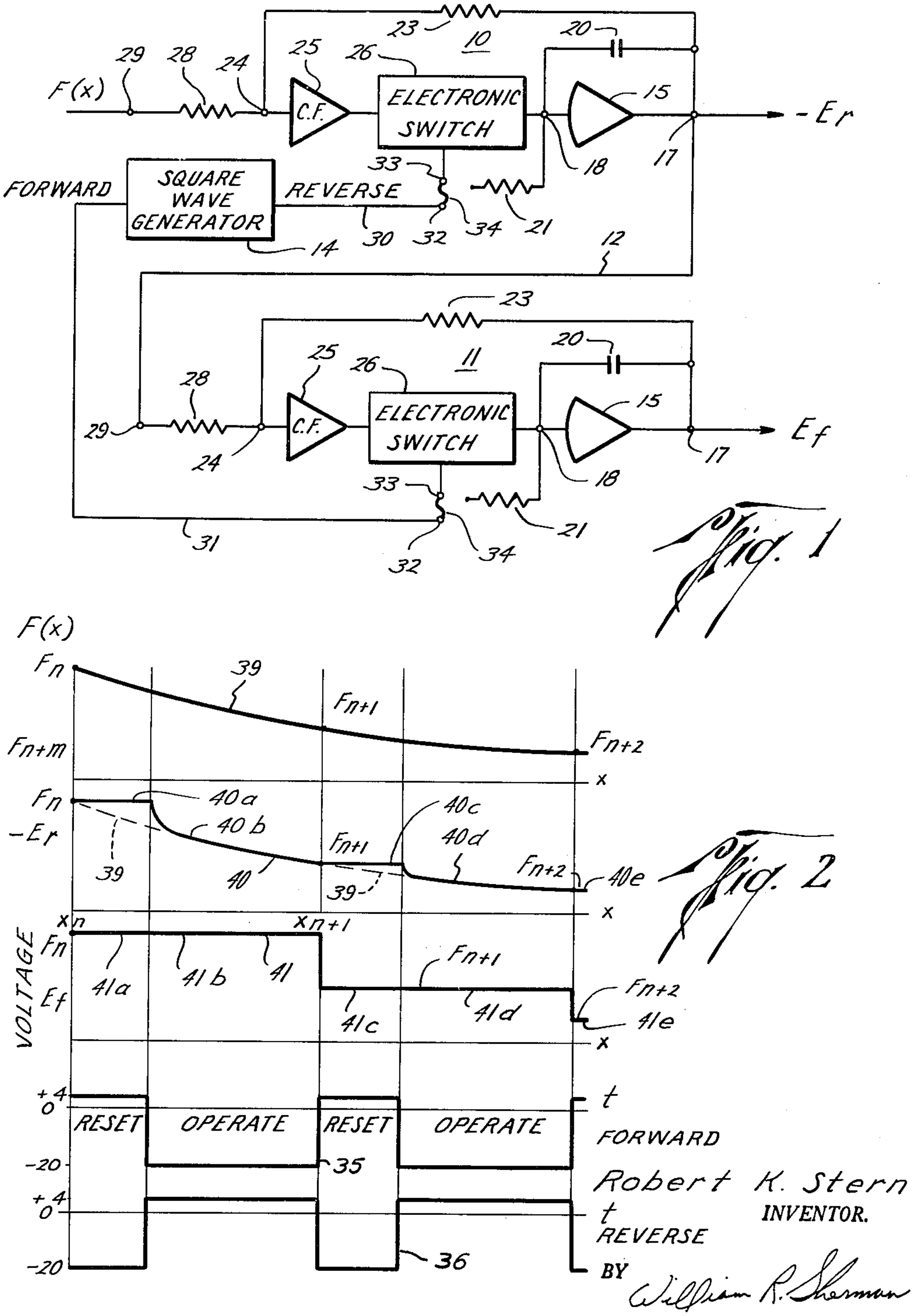
FIG. 1 is a schematic diagram of an analog computing system in accordance with the invention.
FIG. 2 is a graphical representation of the variation of voltages occurring in the system of FIG. 1.

In FIG. 1 there is shown an analog computer comprising a pair of operational amplifier memory units 10, 11 which may conveniently be of identical construction to perform complementary memory functions. The components of each such unit may be permanently wired in circuit or, as in a typical general purpose analog computer, some or all terminals of their components may be brought out to a patch bay, switch board or relay contacts (as represented by junction dots) for interconnection to provide memory units of desired configuration. In the same fashion, the operational amplifier memory units 10, 11 may have either a permanent cascade connection or preferably may be selectively connected in cascade by a patch bay jumper 12 or the like.

The analog computer also includes a suitable source of timing waves, such as square wave generator 14 for establishing the cyclic intervals of repetitive or iterative operation. While a single timing wave circuit may be employed, the exemplary generator 14 is shown to provide outputs designated as "forward" and "reverse" in phase opposition (e.g., of opposite polarity). Typically, the general purpose analog computer would include numbers of additional integrator amplifiers, summing amplifiers, multipliers, function generators, and other arithmetic units, and a variety of resistors, capacitors and potentiometers, as well as regulated voltage sources, mode and control switches, with which a variety of problems can be programmed for repetitive or iterative operation utilizing the novel arrangements of the present invention.

Each of operational amplifier units 10 and 11 includes an operational or computing amplifier 15 which generally is of a high-gain, direct coupled (D.C.), drift-free or drift-stabilized, phase-inverting type, preferably characterized by a wide bandwidth and correspondingly fast rise time for handling dynamically varying signals in high speed repetitive operation.

To provide the memory unit with capacitive signal storage, there is preferably connected between output and input terminals 17, 18 of the amplifier 15 an integrating capacitor 20 having a capacitance of, say, 0.01 microfarad for a 100:1 time speed up, as compared with the usual 1 microfarad. To accommodate input signal integration, provision is made for connection of one or more normal input resistors, such as resistor 21, to input terminal 18 of amplifier 15. Typical values for such input resistors are 100 kilohms or one megohm, depending on the value of capacitor 20 and the gain desired, either permitting application of an input voltage continuously without impairing operation of the integrator memory in accordance with the present invention. Indeed, for some iterative programming of problems, voltages may be applied to the input resistor 21 of one or the other of units 10, 11. Typically, however, the normal input resistors may remain unused and unconnected.

The integrating capacitor 20 is thus arranged in a first feedback loop around amplifier 15 for relatively drift-free signal storage. There is further provided a second feedback loop which includes a feedback resistor 23 connected between amplifier output terminal 17 and a summing point 24 in the loop. Such summing point is, for purposes of the present invention, connected to the input terminal 18 for the amplifier via means which provides not only an impedance transformation or stepdown but also a connection which is selectively operative so that the second feedback loop may be alternatively incomplete and completed in an operative sense. Since both of the feedback loops are required to be degenerative, this being true of the first feedback loop by virtue of the inverting action of amplifier 15, the means connected between summing point 24 and input terminal 18 desirably effects zero or an even number of phase reversals.

To exemplify such means, there are shown an impedance transforming amplifier 25 and high speed or electronic switch 26 conveniently coupled in that order between summing point 24 and terminal 18. Amplifier 25, in a preferred form, incorporates a gain stabilized cathode follower or emitter follower providing the desired transformation between a high impedance input and a low impedance output with unity voltage gain, and output impedance of a fraction of an ohm to, say, 50 ohms being exemplary. The connection of output current from this low impedance source is conveniently controlled by utilizing triodes, discharge-type or solid state diodes, transistors or the like in any suitable switching configuration which substantially interrupts current to the amplifier input 18 in the OFF condition and connects such current with minimum drift and attenuation in the ON condition. Of course, the impedance transforming and switching functions may be combined, as in a gated amplifier, or reversed in order, or otherwise provided for in a variety of ways while serving the purposes of the present invention. Also, a mechanical switch or relay may be employed although generally not susceptible to as high speed operation as may be desired.

To couple an input signal into the memory unit 10 or 11, a memory input resistor 28 is provided, connected between input terminal 29 of the memory unit and summing point 24 and having a value preferably equal to or a multiple or submultiple of the resistance value of feedback resistor 23. For example, each may be 100 kilohms. To distinguish from the normal input resistor 21, memory input resistor 28 is sometimes referred to as the reset or initial condition input resistor. The overall configuration of the computing amplifier 15 with feedback capacitor 20 and resistor 23 and memory input resistor 28 may be recognized as a so-called lag summer modified, however, by the presence of amplifier and switching means 25, 26.

To utilize these means in accordance with the present invention, the oppositely phased timing waves from square wave generator 14 are applied via respective forward and reverse busses 30, 31 and patch bay terminals 32 to the control input patch bay terminal 33 for the electronic switch 26 of the respective forward and reverse memory units 11 and 10, utilizing patch bay jumpers 34. While for some purposes, the forward and reverse timing waves might be identical apart from their phasing, preferably they are each characterized by different time intervals of their peak excursions in each cycle, as exemplified graphically by the respective curves 35 and 36 of FIG. 2. The particular wave form and amplitude excursions are properly determined by the requirements for actuating switch 26. In the figure, the timing waves have a square wave form of alternate polarity defining recurrent first and second intervals occurring in alternate sequence. The intervals are designated in connection with curve 35 (forward bus) as a relatively short reset (first) interval and a relatively long operate (second) interval, such designations being adopted by closest analogy to terms employed heretofore in the analog computer art. In the reset interval, a negative (e.g., −20 volts) gating voltage is applied via reverse bus 30 to electronic switch 26 of the first (or reverse) memory unit 10 and the positive (e.g., +4 volts) or blocking voltage is applied to the electronic switch of the second (or forward) memory unit 11. The voltages of opposite polarity are applied to the respective units during the succeeding, longer operate interval.

To exemplify a typical operation of the apparatus of FIG. 1, there is graphically illustrated by curve 39 of FIG. 2 a possible input wave form for the signal applied to input terminal 29 of the first or reverse memory unit 10. Such signal, for purposes of a problem entered in the analog computer, may be characterized by a function $f(x)$ where $x$ is an independent variable represented in the machine by time, that is, by real time or a time characteristic of the machine operation in the iterative mode. For purposes of discussion, then, the input wave 39 has an initial value $F_n$ followed by dipping portion extending through the first reset and operate intervals, and a further portion approaching asymptotically toward a value $F_{n+m}$ and extending through the second cycle of reset and operate intervals.

Throughout the first reset interval, the electronic switch 26 of the reverse memory unit 10 is gated "OFF" or open by the negative potential supplied via reverse bus 30. The value $F_n$ of the input voltage is accordingly stored or held at the output terminal 17 of the reverse memory unit 10 as output signal $-E_r=-F_n$ (portion 40*a* of curve 40). The switch 26 of forward memory unit 11 is at the same time gated "ON" or closed, whereby unit 11 becomes a high-speed lag summer. Thus, the impedance transforming amplifier 25 of memory unit 11 is responsive to the sum of the input $-E_r=-F_n$ and the output $E_f$ of the forward memory unit 11 to supply a charging current to the storage capacitor 20 from its low impedance output. Because of such low impedance, the time constant for resetting the charge on the capacitor 20 is correspondingly reduced with respect to that of conventional lag summers and may, for example, be characterized by a resetting time on the order of 100 microseconds or less (or by an output voltage rise of, say, 1 volt/microsecond, or more). As the input $-E_r$ remains constant at $F_n$ through the reset interval, the output $-E_r$ is driven to the same magnitude by the high gain inverting action of the computing amplifier 15 and by charging amplifier 25 within a time on the order of 100 microseconds or less. Hence, the forward memory output $E_f$ (portion 41*a* of curve 41) tracks the reverse memory output $-E_r$ and is equal to $F_n$ throughout the reset interval. A negative voltage serving to gate switch 26 of forward memory unit 11 OFF is applied via forward bus 31 during the subsequent operate interval. Hence, forward memory unit 11 holds its output $E_f$ (curve portion 41*b*) constant at the value $F_n$ (with polarity inversion)

of its input at the termination of the preceding or first reset interval. The positive voltage on the reverse bus 30 at the same time gates switch 26 of reverse memory unit 10 ON. Accordingly, during this operate interval, the output $-E_f$ actually tracks the input $F(x)$ continuously with a minimum lag so that, as shown in FIG. 2, output voltage wave form 40*b* through the operate interval is identical with input wave form 39, even to jumping almost instantaneously from the initial value $F_n$ to the existing value of $F(x)$ at the beginning of the first operate interval. If the switch 26 of reverse memory unit 10 remained closed thereafter, the output of the reverse memory unit 10 would simply be a reproduction of the input with the polarity inverted.

However, for purposes of the invention, each operate interval is followed during repetitive operation by a reset interval whereupon tracking of the input voltage is terminated and the value of the reverse memory unit output voltage (and input voltage equal thereto) at the instant of such termination is acquired in capacitive storage for holding through the remainder of the cycle, as represented at 40*c*. Assuming that the instant when the operate interval terminated corresponds with a value $X_{n+1}$ of the variable and the corresponding value of the function $F(x)$ at this instant is $F_{n+1}$, the curve portion 40*c* is a straight line representing the constant value $F_{n+1}$ held at the output terminal 17 of the reverse memory. The forward memory output $E_f$ is, of course, unaffected by the varying output of the reverse memory during the operate cycle.

On the inception of the next operate interval, the reverse memory output voltage $-E_r$ again tracks the input producing a wave form 40*d* substantially identical to the corresponding portion of curve 39. Similarly, there follows during the subsequent reset interval a holding of the value $F_{n+2}$ acquired by the input (and hence the tracking output) at the termination of the operate interval and corresponding with the value $X_{n+2}$, as shown at 40*e*.

Of course, the voltage $-E_r$ appearing at output terminal 17 of the reverse memory unit 10 is applied directly by jumper 12 to the input terminal 29 for the forward memory unit 11. However, the sequence of tracking and holding modes for the forward memory unit is the reverse or complement of that for the reverse memory unit, i.e., 180° out-of-phase. Hence the output voltage $E_f$ derived from the forward memory unit may be characterized by curve 41 of stepped configuration, the portion 41*a* through the first reset interval having a constant value $F_n$ corresponding to a tracking of the output of the reverse memory unit, and portion 41*b* of constant value $F_n$ representing a holding of the output at the end of the first reset interval. Then follow portions 41*c* and 41*d* of constant value $F_{n+1}$ continuing through the second reset and subsequent operate intervals of the second cycle. In the third cycle, the forward memory unit 11 tracks the output $F_{n+2}$ of the reverse memory unit 10 during the reset interval and holds this output through the subsequent operate interval, as at 41*e*.

In other words, the output of the forward memory unit tracks the output of the reverse memory unit in the reset mode during the reset intervals and holds the last-acquired value in the storage mode during the respective succeeding operate intervals. By comparing curves 40 and 41, it will be evident that a value acquired in memory at the beginning of the reset interval in a first cycle is available in memory through the succeeding operate interval of the same cycle. The output of the cascaded reverse and forward memories may further be characterized as a stepped voltage representing a periodic sampling of instantaneous values of the input, each such value being being held for substantially a full cycle.

The embodiment of FIG. 1 is conveniently referred to as a ratchet circuit because of its typical use in memorizing values from one cycle to be used in a succeeding cycle. Assuming that the circuit is utilized in a problem hook-up where the input $F(x)$ has successive values $F_n$, $F_{n+1}$, $F_{n+2}$ . . . , the condition with $F_n$ at the output and $F_{n+1}$ at the input will be reached in the operate interval of the second cycle. This occurs because the reverse memory 10 tracks the input during the operate interval of, say, the first cycle, stores the value $F_n$ during the reset portion of the succeeding cycle (as a negative value), while the forward memory 11 tracks such stored value $F_n$ during the reset portion of the second cycle and stores it during the succeeding operate interval in the same cycle. In a typical application, then, the forward memory 11 will make available a value of $F_n$ which may be utilized throughout an entire cycle of reset and operate for calculations of the value of $F_{n+1}$ in associated portions of the problem setup in the analog computer to obtain the value of this subsequent parameter for use in the following cycle. This value $F_{n+1}$ then is derived from the associated problem circuitry and returned to the input of the reverse memory for memorization during the succeeding reset period to provide the value $F_{n+1}$ at the output of the forward memory for use in the calculation of $F_{n+2}$, etc.

Figure 3:
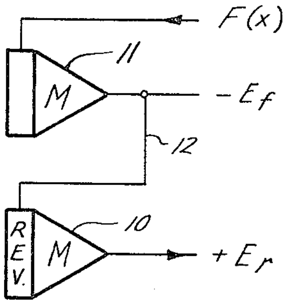
FIG. 3 is a schematic representation of a modification of the system of FIG. 1.

It is possible to obtain different results within the purview of the present invention by cascaded connection of the reverse memory following the forward memory, as illustrated in FIG. 3. Here a symbol which has been adopted in the art in conjunction with computer programming, in the practice of the present invention, is employed to represent the respective forward and reverse memories 11 and 10. The "M" appearing in the triangular portion of the symbol representing an operational amplifier designates it as a capacitive memory unit and the line connection at one end of the rectangle abutting the base of the triangle designates the memory or initial condition input. A line applied to the side of the rectangle opposition from the triangle would designate a normal input to be integrated. To distinguish the integrator memory unit which has its resetting control terminal connected to the "reverse" bus of the repetitive operation driving system for the computer, the abbreviation REV is put in the rectangle.

The cascaded connection of this embodiment is shown to be made again by jumper 12. Implicit in this schematic representation of FIG. 3 are the connections from the repetitive operation driving system, e.g. the timing wave generator 14, to the respective resetting control terminals 33 of the memory units 10, 11. Since the "forward" bus 31 from the timing wave generator is characterized as carrying a cyclic control signal providing a shorter interval of switch ON than switch OFF, the designation of one of the memory units (i.e., 11) by the symbol shown in FIG. 3, signifying a forward memory unit, is fully specific to its connections in the analog computer. Correspondingly, the illustrated symbol for the reverse memory unit 10 fully characterizes connection of its control terminal 33 with the reverse bus 30 carrying the complementary control signal out of phase, negative, or in phase opposition, with respect to that on bus 31.

Figure 4:
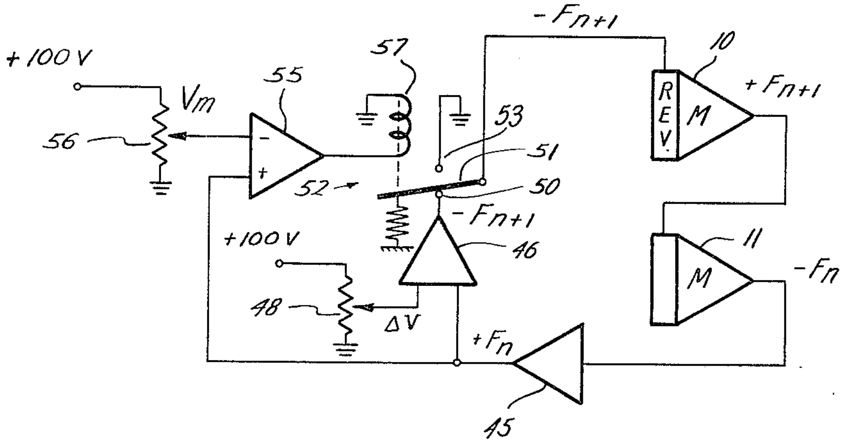
FIG. 4 is a schematic diagram of an application of the system of FIG. 1.

In another application, the ratchet circuit of FIG. 1 may be employed in a so-called accounting circuit, as shown in FIG. 4. Here, the output of forward memory unit 11 is applied to the input of a unity gain, sign inverting operational amplifier 45, the output of which connects with a unity gain input of summing amplifier 46. The other unity gain input is connected to the arm of potentiometer 48, across which is applied a reference voltage, e.g., 100 volts. Through normally closed fixed and movable contacts 50, 51 of double-throw relay 52, connection is made from summer 46 to the memory input of reverse memory unit 10.

To close contacts 51, 53 of relay 52 and thus ground the memory input, a differential or relay amplifier 55 has the output of inverter 45 applied to its + input terminal and the divided voltage from potentiometer 56 applied to its — terminal, the output being connected across relay solenoid 57.

In a typical operation of the accounting circuit of FIG. 4, the output $-F_n$ of the forward memory 11 is inverted in sign and added to the voltage ΔV determined by setting of potentiometer 48 and representing a suitable stepwise increment, such as 1 volt. The resulting voltage $F_{n+1}$ is returned to the input of the reverse memory 11 with an inverted sign. With subsequent cycles of operation, the output of the forward memory increases stepwise by such increment ΔV until it reaches the desired maximum value $Vm$ determined by setting of potentiometer 56. Then, the input to the reverse memory is returned to ground (or some desired initial value) by response of relay closing amplifier 55, for a repeat of the staircase output wave form. Since the ratchet circuit utilized in this accounting arrangement is stepped in sequence from busses 30, 31 which may be used in other components in the problem circuitry, a control voltage is made available at the output of the forward memory (or the reverse memory, if desired) which increases by known increments, either for purposes of controlling associated circuitry after a desired number of cycles have been completed or to make available to associated circuitry a uniformly stepped voltage representing some condition of the problem.

In an application of the circuit arrangement of FIG. 3, as well as that of FIG. 1, a cascaded series of forward, reverse, and forward memory units 11, 10, 11*a* is utilized to obtain the derivative $F'(x)$ of input signal $F(x)$, to a good approximation. For this purpose, the output of first forward memory unit 11 is connected via potentiometer 60 to one input of summer 61. Similarly, the output of second forward memory unit 11*a* is connected via inverter 62 and potentiometer 63 to the other input terminal of summer 61. As before, jumpers 12 are used to effect series connection between the output of one memory unit and the memory input of the next, and such memory units have appropriate connection to the timing wave generator for control of their cyclic operation.

Figure 5:
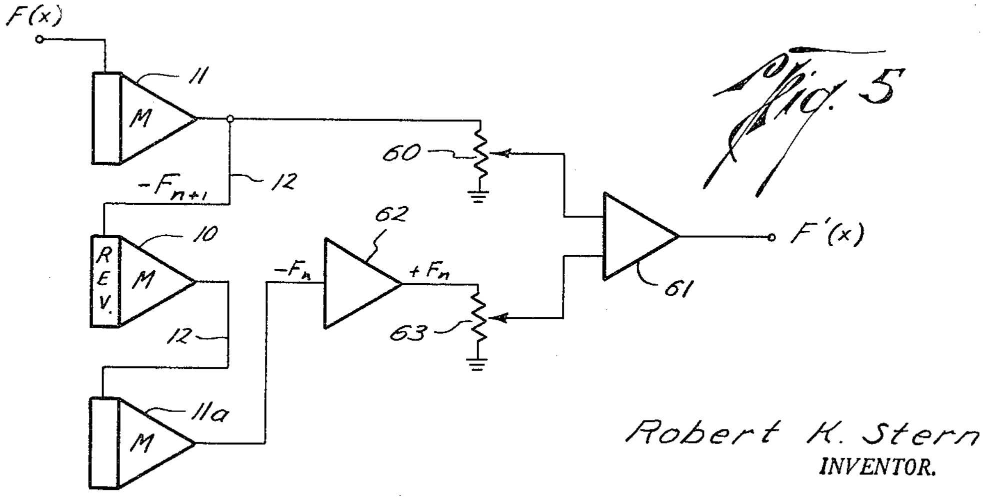
FIG. 5 is a schematic diagram of an application of the system of FIG. 3.

In an operation of the computing arrangement of FIG. 5, forward memory unit 11 samples the input signal $F(x)$ at successive points $X_n, X_{n+1} \ldots$, spaced by the fixed small increment $\Delta x$ (reciprocal of the repetitive operation frequency). Each such sample $F_n, F_{n+1} \ldots$ is held in memory during the operate interval following its acquisition. Since reverse memory unit 10 is tracking during the operate interval, its output is a stepped succession of $F_n$, $F_{n+1} \ldots$, each voltage being held through the reset interval as well as the previous operate interval. The function of the second forward memory unit 11*a* is then to make available during the respective subsequent operate cycles the same voltage value as is held in memory by the first forward memory unit 11 during the preceding operate intervals. This results from the fact that the second forward memory unit 11*a* tracks and acquires the stored output of the reverse memory unit during each reset interval for holding during the subsequent operate interval.

Consequently, taking account of sign inversion, there are simultaneously applied to potentiometers 60, 63 corresponding successive voltages $-F_{n+1}, -F_{n+2} \ldots,$ $$-F_{n+m+1}$$

and $F_n, F_{n+1} \ldots, F_{n+m}$, respectively. By setting each of the potentiometers 60, 63 to give a fractional output $1\Delta/x$, the output of the summer 61 in the operate intervals is $(F_n-F_{n+1})/\Delta x, (F_{n+1}-F_{n+2})/\Delta x, \ldots (F_{n+m}-F_{n+m+1})/\Delta x$, that is, substantially the derivative of $F(x)$ for very small values of $\Delta x$ (corresponding to a high repetitive sampling rate).

If desired, a memory unit may be supplied with the output from summer 61 to hold the derivative values obtained in the operate intervals through each of the intervening reset intervals. Also, the potentiometers may be replaced by a single potentiometer at the summer output.

In such case, with the output of memory unit 10 connected directly to the summer input, the memory unit tied with the summer output can be used to store the derivative value acquired during reset intervals. Thus, summers or inverters may be interposed between memory units in cascaded arrangements for some computer programs.

While the invention has been exemplified by an uninterrupted sequence of reset and operate intervals, such intervals having durations different but of the same order of magnitude, the relative duration of the reset interval may be lengthened or preferably shortened, and provision may be made for desired overlap or underlap of the respective intervals, as may best suit the particular memory units or applications at hand. Furthermore, while the exemplary embodiments are characterized by a repetitive operation of fixed iterative or cyclic rate, such as would generally be of practical utility, the invention is not necessarily restricted in this respect but contemplates a timing wave available in common to a plurality of integrator amplifiers, as many as may be required in the desired problem circuitry.

Also, in many instances, the forward and reverse memories of the present invention may be utilized in conjunction with memories of identical or similar construction but gated between the tracking and holding modes at a variable or problem-determined time within the operate intervals, this type of memory being conveniently designated an "X" or an "O" memory depending upon whether it is shifted to a holding or a tracking condition at such instant of time. Again, the invention may be practiced in a modification of the "X" and "O" memories, conveniently referred to as "extended-X" $(\overline{X})$ and "extended-O" $(\overline{O})$ memories. For the extended-X memory, the operate cycle is initially characterized by tracking (as in the X memory) but is switched to holding for the duration of the operate interval and for the subsequent reset interval as well, at an instant of time variable within the operate interval. The extended-O memory, on the other hand, is initially in a hold condition (like the O memory) in the operate interval and at such variable instant is switched to the tracking mode for the remainder of the operate interval and the subsequent reset interval. To control the instant of switching, a voltage comparator having two reversible polarity outputs, for example, may be employed to provide a negative control signal to the X memory units and a positive control signal to the O memory units, when a comparison occurs (e.g., upon equality of two comparator input voltages). While ordinarily such control signals would be supplied to the corresponding memory units only from the time a comparison occurs within an operate interval until the end of such interval, the comparator may be supplied with voltages from the forward and reverse busses to hold the O output positive and the X output negative for the succeeding reset interval, as well. If switch 26 were closed by a negative rather than a positive voltage, of course the control signal polarities should be reversed. Reference may be had to my copending application Serial No. 99,828 filed March 31, 1961 for a further description of X, O, $\overline{X}$ and $\overline{O}$ memories and a voltage comparator suitable for use therewith.

With regard to the circuitry of the memory units, high speed or electronic switching may be accomplished outside, as well as inside the computing amplifier feedback loop. The switches may be adapted for actuation by any type of waveform, e.g., pulse, sinusoidal, sawtooth, stepped, etc. However, for precise timing, sharp leading and trailing edges corresponding to the reset and operate intervals are desirable.

By suitable switch arrangements, a single or common timing wave may be operative to transfer the switch of one memory unit from the tracking to the hold mode and the differently conditioned switch of another memory unit from the hold to the tracking mode. For example, such switches may have a selectively operable sign inverting input stage by which the memory units may be conditioned as forward or reverse, or X or O. In addition, the switches may incorporate delayed opening or closing, as desired.

In some problem setups, different groups of memory units may be programmed at different repetitive operation rates, or some in real time. The speed of capacitor recharging upon switching to the tracking or resetting mode may be increased, if desired, by using as a coupling circuit at the memory input terminal a capacitor in parallel with memory input resistor 28 and having a capacitance substantially equal to the time constant of the reset circuit divided by resistance 28.

The invention is, of course, susceptible to various other modifications and additions. Accordingly, the invention is not intended to be restricted to the embodiments illustrated and described but is of a scope defined in the appended claims.

I claim:

1. An analog computer comprising a plurality of integrating amplifier units each including an operational amplifier provided with an integrating capacitor arranged for connection in a first feedback loop between the output and input terminals of said amplifier, a feedback resistor arranged for connection in a second such feedback loop, an input resistor connected with said feedback resistor at a summing point in said second feedback loop, and impedance step-down and switching means connected between said summing point and the input of each said amplifier for selectively effecting an operative connection between the same; means for connecting said amplifier units in cascade, and control means coupled with said selective means of at least one of said amplifier units recurrently to effect an operative connection between the respective summing point and amplifier input thereof.

2. An analog computer comprising a plurality of integrating amplifier units each including an operational amplifier provided with an integrating capacitor arranged for connection in a first feedback loop between the output and input terminals of said amplifier, a feedback resistor arranged for connection in a second such feedback loop, an input resistor connected with said feedback resistor at a summing point in said second feedback loop, and impedance step-down and switching means connected between said summing point and the input of each said amplifier for selectively effecting an operative connection between the same; means for connecting said amplifier units in cascade, and control means coupled with said selective means of at least two such amplifier units recurrently to effect an operative connection between the respective summing point and amplifier input thereof.

3. An analog computer comprising a plurality of integrating amplifier units each including an operational amplifier provided with an integrating capacitor arranged for connection in a first feedback loop between the output and input terminals of said amplifier, a feedback resistor arranged for connection in a second such feedback loop, an input resistor connected with said feedback resistor at a summing point in said second feedback loop, and impedance step-down and switching means connected between said summing point and the input of each said amplifier for selectively effecting an operative connection between the same; means for connecting said amplifier units in cascade, and control means coupled with said selective means of at least two such amplifier units alternately to effect an operative connection between the respective summing point and amplifier input thereof.

4. An analog computer comprising a plurality of integrating amplifier units each including an operational amplifier provided with an integrating capacitor arranged for connection in a first feedback loop between the output and input terminals of said amplifier, a feedback resistor arranged for connection in a second such feedback loop, an input resistor connected with said feedback resistor at a summing point in said second feedback loop, and impedance step-down and switching means connected between said summing point and the input of each said amplifier for selectively effecting an operative connection between the same; means for connecting said amplifier units in cascade, and control means coupled with said selective means of at least two such amplifier units alternately to effect an operative connection between the respective summing point and amplifier input thereof during successive predetermined time intervals.

5. An analog computer comprising at least two memory units, each of said units including an operational amplifier provided with an integrating capacitor arranged for connection in a first feedback loop, a feedback resistor arranged for connection in a second feedback loop, an input resistor connected with said feedback resistor at a summing point in said second feedback loop, and switch means connected between said summing point and the input of each said amplifier for selectively completing said second feedback loop; means for connecting the amplifier output of one of said memory units to the input resistor of the other, and means coupled with the respective switching means of said memory units for completing their second feedback loops in alternate synchronization.

6. An analog computer comprising at least two memory units, each of said units including an operational amplifier provided with an integrating capacitor arranged for connection in a first feedback loop, a feedback resistor arranged for connection in a second feedback loop, an input resistor connected with said feedback resistor at a summing point in said second feedback loop, and switch means connected between said summing point and the input of each said amplifier for selectively completing said second feedback loop; means for connecting the amplifier output of one of said memory units to the input resistor of the other, and means coupled with the respective switching means of said memory units and supplying oppositely phased timing signals thereto for periodically completing their second feedback loops in alternate synchronization.

7. An analog computer comprising at least two memory units, each of said units including an operational amplifier provided with an integrating capacitor arranged for connection in a first feedback loop, a feedback resistor arranged for connection in a second feedback loop, an input resistor connected with said feedback resistor at a summing point in said second feedback loop, and switch means connected between said summing point and the input of each said amplifier for selectively completing said second feedback loop; means for connecting the amplifier output of one of said memory units to the input resistor of the other, and square wave generating means coupled with the respective switching means of said memory units and supplying square wave signals of opposite phase thereto for periodically completing their second feedback loops in alternate synchronization, the successive portions of said square wave signals in each cycle being of unequal duration.

8. An analog computer comprising first and second amplifier means for instantaneously reproducing a variable input signal and for selectively storing the value thereof during alternate intervals, means for connecting the output of said first amplifier means to the input of said second amplifier means, control means coupled with each of said amplifier means and operative during alternate first and second intervals to cause said first amplifier means during said second intervals to store the last values of its input reproduced during respectively preceding first time intervals and to cause said second amplifier means to reproduce such last values during the respective second intervals and store the same during the respectively succeeding first time intervals.

9. An analog computer comprising first and second amplifier means for instantaneously reproducing a variable input signal and for selectively storing the value thereof during alternate intervals, means for connecting the output of said first amplifier means to the input of said second amplifier means, control means coupled with each of said amplifier means and operative during alternate first and second intervals to cause said first amplifier means during said second intervals to store the last values of its input reproduced during respectively preceding first time intervals and to cause said second amplifier means to reproduce such last values during the respective second intervals and store the same during the respectively succeeding first time intervals, said first time intervals being longer than said second time intervals.

10. An analog computer comprising first and second amplifier means for instantaneously reproducing a variable input signal and for selectively storing the value thereof during alternate intervals, means for connecting the output of said first amplifier means to the input of said second amplifier means, control means coupled with each of said amplifier means and operative during alternate first and second intervals to cause said first amplifier means during said second intervals to store the last values of its input reproduced during respectively preceding first time intervals and to cause said second amplifier means to reproduce such last values during the respective second intervals and store the same during the respectively succeeding first time intervals, said second time intervals being longer than said first time intervals.

11. An analog computer comprising a plurality of integrator amplifiers for reproducing a varying input signal at their outputs, each of said amplifiers including controllable switching means for causing the input signal reproduced at the output to be stored; means for connecting said amplifiers in cascade relation, control means providing a pair of timing waves of opposite phase, and means for connecting said control means selectively with each of said switching means for applying a respective one of said timing waves thereto.

12. An analog computer comprising at least a pair of memory units arranged for connection in cascade relation, each responsive to a control signal to store at its output a potential corresponding to a varying signal applied at its input, and means for applying timed control signals to said memory units in recurrent intervals.

13. An analog computer comprising at least a pair of memory units arranged for connection in cascade relation, each responsive to a control signal to store at its output a potential corresponding to the instantaneous amplitude of a varying signal applied at its input, and means for applying differently timed control signals to said memory units in recurrent intervals to advance the potential stored at the output of the first of said pair of memory units to the output of the second of said units in successive intervals.

14. An analog computer comprising at least a pair of memory units arranged for connection in cascade relation, each responsive to a control signal to store at its output a potential corresponding to the instantaneous amplitude of a varying signal applied at its input, means for applying differently timed control signals to said memory units in recurrent intervals to advance the potential stored at the output of the first of said pair of memory units to the output of the second of said units in successive intervals, and means coupled between the output of said second memory unit and the input of said first memory unit for applying to such input a sequence of potentials corresponding to the successive potentials of the output of said second memory unit, each potential in said sequence differing by a fixed increment from the corresponding output potential, whereby the output potential of said second memory unit changes stepwise by said increment.

15. An analog computer comprising at least a pair of memory units arranged for connection in cascade relation, each responsive to a control signal to store at its output a potential corresponding to the instantaneous amplitude of a signal applied at its input, and means for applying differently timed control signals to said memory units in recurrent intervals to advance the potential stored at the output of the first of said pair of memory units to the output of the second of said units in successive intervals, and means coupled with the outputs of each of said memory units for deriving a potential representing the difference between the input signal amplitudes stored at the output of the first of said memory units in successive ones of said recurrent intervals.

16. An analog computer comprising at least three memory units arranged for connection in cascade relation, each responsive to a control signal to store at its output a potential corresponding to the instantaneous amplitude of a signal applied at its input, means for applying recurrent control signals to the first and third of said memory units alternately with application of such control signals to the second of said memory units to store at the output of said first and third memory units potentials corresponding to the signals applied at their inputs during first intervals and to store potentials at the output of said second memory unit corresponding to the outputs of said first memory unit during alternate second time intervals, means for summing the output potential of said first memory unit and the negative of the output potential of said third memory unit to derive a difference potential, and means for reducing said difference potential by a factor corresponding to the interval between storage of successive amplitudes of said input signal to obtain an approximation of the derivative of said input signal.

References Cited by the Examiner

UNITED STATES PATENTS

| | | | |
|---|---|---|---|
| 2,891,725 | 6/1959 | Blumenthal et al. | 235—183 |
| 2,967,018 | 1/1961 | Fogarty | 235—194 X |
| 3,002,690 | 10/1961 | Meyer | 235—183 |
| 3,008,094 | 11/1961 | Trimmer | 235—183 X |
| 3,016,197 | 1/1962 | Newbold | 235—197 X |

OTHER REFERENCES

Pages 1540–1544, September 1960, Andrews, "The Dynamic Storage Analog Computer—DYSTAC," Instruments and Control Systems.

Pages 1545–1549, September 1960, Gilliland et al., "Use of Analog Memory for Simulation of a Melting Slab," Instruments and Control Systems.

Page 289, February 1960, Instruments and Control Systems.

MALCOLM A. MORRISON, *Primary Examiner.*

WALTER W. BURNS, JR., *Examiner.*